(12) United States Patent
Nielson et al.

(10) Patent No.: US 7,455,491 B1
(45) Date of Patent: Nov. 25, 2008

(54) VEHICLE RACK SYSTEM, APPARATUS AND METHODS THEREOF

(75) Inventors: Randy S Nielson, Central Valley, UT (US); Dick W. Shepherd, Central Valley, UT (US)

(73) Assignee: Mad Terrain LLC, Inwood, NY (US)

( * ) Notice: Subject to any disclaimer, the term of this patent is extended or adjusted under 35 U.S.C. 154(b) by 0 days.

(21) Appl. No.: 11/840,930

(22) Filed: Aug. 17, 2007

(51) Int. Cl.
  *B60P 7/08* (2006.01)

(52) U.S. Cl. .................. 410/16; 410/3; 410/4; 410/23; 410/24; 410/26; 410/30

(58) Field of Classification Search ............ 410/2, 410/3, 4, 7, 13, 16, 23–27, 30, 67, 97, 106, 410/129; 296/3; 224/403, 404, 405, 433, 224/533, 543, 558, 567; 414/462, 537; 211/85.8, 211/85.7, 195
See application file for complete search history.

(56) References Cited

U.S. PATENT DOCUMENTS

| | | | |
|---|---|---|---|
| 3,103,289 A | 9/1963 | Clary | |
| 3,757,975 A | 9/1973 | Sneider | |
| 4,635,835 A | 1/1987 | Cole | |
| 6,036,417 A * | 3/2000 | Weaver | 410/7 |
| 6,059,496 A | 5/2000 | Stevens | |
| 6,099,232 A | 8/2000 | Dixon et al. | |
| 6,179,181 B1 | 1/2001 | Johnson et al. | |
| 6,371,719 B1 | 4/2002 | Hildebrandt | |
| 6,705,820 B2 | 3/2004 | Schilling | |
| 6,752,574 B2 | 6/2004 | Widdowson | |
| 6,827,543 B2 | 12/2004 | O'Neil | |
| 6,848,873 B1 | 2/2005 | Husk | |
| 6,913,304 B1 | 7/2005 | Sweet | |
| 6,981,835 B1 | 1/2006 | Groth | |
| 7,051,909 B2 | 5/2006 | Gibson | |
| 7,198,443 B2 | 4/2007 | Macomber, III | |
| 2004/0262347 A1 | 12/2004 | Green | |
| 2005/0095077 A1 | 5/2005 | Bright | |
| 2005/0281629 A1 | 12/2005 | Brown | |
| 2006/0196906 A1 | 9/2006 | Gibson, Jr. | |

* cited by examiner

*Primary Examiner*—Stephen Gordon
(74) *Attorney, Agent, or Firm*—David Landman; Landaleip, Inc.

(57) ABSTRACT

A vehicle apparatus and a vehicle rack system comprising at least two vehicle rack apparatus are disclosed. The vehicle rack apparatus comprises one or more clamp assemblies adapted to couple to a panel of a trailer or a truck. One or more front members are coupled to a portion of each of the clamp assemblies. A platform assembly is coupled to a portion of each of the clamp assemblies. The platform assemblies include three spaced apart members. The vehicle apparatus further comprises one or more ramp assemblies coupled to a portion of the platform assemblies so that when a an end of the ramp assemblies contacts a portion of a surface of the truck bed or the trailer bed, the platform assemblies are elevated. Methods of using the vehicle apparatus and system are disclosed.

12 Claims, 6 Drawing Sheets

Fig. 1A

Prior Art

Fig. 1B

Prior Art

VEHICLE RACK SYSTEM, APPARATUS AND METHODS THEREOF

FIELD OF THE INVENTION

This invention generally relates to apparatus suitable for transporting a variety of vehicles in a trailer or truck bed and more specifically to a convenient lightweight vehicle rack system, apparatus and methods as well as a commercial kit to distribute at least one vehicle rack system.

BACKGROUND OF THE INVENTION

In the past, various types of devices have been suggested for use to transport bicycles, motorcycles, all-terrain vehicles (hereinafter ATV) and the like. These devices have either been mounted on a side of a transport vehicle or in a trailer or alternatively coupled in some fashion to a truck bed or a trailer bed. According to the numerous disclosures of such transport devices, inevitably the devices appear to be quite complex and purport to offer advantages of various kinds.

In an exemplary disclosure to Schilling, U.S. Pat. No. 6,705,820, the transportation device is a carrier/lift for a truck bed. According to Schilling, the carrier/lift comprises a platform having a recess for storage of nest able loading ramps. Furthermore, the ramp can be stored above the floor of a truck bed to provide usable storage space in the truck between the platform, with the nested ramps stowed therein, and the floor of the truck bed. Schilling's lift/carrier depends on a substantially large platform that may carry and lift the entire ATV, which may be driven up the nested ramps, which may then be stored. Furthermore, Schilling discloses that the platform requires a pivoting movement of the platform about an axis of a transverse beam along a pair of longitudinal tracks to provide a pivoting and translating motion of the platform that facilitates loading, carrying and uploading a small vehicle (such as an ATV) in the bed of the truck. Additionally, wheel chocks may be attached to the platform for positioning and securing the ATV (or small vehicle) in the carrying position. Simply put, the Schilling carrier/lift has a complex mechanism to lift the platform once an ATV is driven up the ramps or once the ATV is hoisted onto the platform. While it is clear that such a device may have certain advantages, the economic cost of construction of this lift/carrier may be rather high, while the use of moving parts may lead to significant mechanical breakdowns in the course of time for a consumer.

In yet another exemplary disclosure, Widdowson, U.S. Pat. No. 6,752,574, the transportation device enables the tailgate of a short bed pickup truck to remain closed. Evidently, according to Widdowson, transportation devices of the kind disclosed are unable to accommodate an ATV or motorcycle in the bed of such a transport vehicle and as evidenced by Schilling above a platform is used to raise the ATV above the truck bed instead. Widdowson discloses a complicated method for placing an ATV onto a truck bed. In the Widdowson approach, the ATV is placed into a cargo box with a rear portion of the ATV protruding past an open end of the cargo box. Furthermore, a support is positioned into the cargo box adjacent to the open end of the cargo box and the rear portion of the ATV is lifted onto the support until the rear portion is elevated sufficiently to provide clearance to enable the open end to be closed by the tailgate. However, Widdowson depends on the cargo box which contains the ATV (in the case disclosed by Widdowson this is a motorcycle or a snowmobile) being separately lifted onto the truck bed. Widdowson takes no advantage of the mechanical advantage of the motorcycle's motor and of course cannot do so for a snowmobile. Furthermore, the cargo box disclosed by Widdowson is a cumbersome proxy for access to a support, which acts as a "lift". Clearly, whenever a consumer desired to transport the ATV, the consumer would have to access an exterior lift whether the consumer wished to place the ATV on the truck bed or to remove the ATV from the truck bed. Whenever the consumer did not have access to such a "lift" the Widdowson disclosure would be encumbered.

As of the time of the current disclosure, many other types of apparatus and methods have been proposed, but as demonstrated in the above-mentioned disclosure, all of such disclosures appear to exhibit economic or mechanically difficult deficiencies. Thus there appears to be a need to provide improved systems, apparatus and methods for efficiently and economically transporting any type of recreational vehicle including without limitation motorcycles, snowmobiles, all-terrain vehicles and the like.

SUMMARY OF THE INVENTION

The current disclosure is directed to an improved vehicle rack system, apparatus and methods that do not have the limitations or complexities disclosed by prior art ATV transportation devices or methods. The various embodiments disclosed herein are meant to be illustrative of the general concept and are not intended to limit any facet of this disclosure.

In accordance with an embodiment of this invention, a rack apparatus adapted to transport an all-terrain vehicle in a transportation vehicle is disclosed. The apparatus comprises in combination, one or more clamp assemblies having one or more openings. The one or more openings may be configured to selectively couple a portion of the one or more clamp assemblies to a portion of a panel of the transportation vehicle.

The rack apparatus further comprises one or more platform assemblies comprising a plurality of platform members. A portion of an end of each of the plurality of platform members may be coupled to an inner portion of a first side platform member and a portion of an opposite end of the plurality of platform members may be coupled to an inner portion of a second side platform member. A portion of an end of the first side platform member and a portion of an end of the second side platform member may be coupled to a portion of the one or more clamp assemblies.

The rack apparatus may further comprise one or more ramp assemblies having a first side ramp member and a second side ramp member. A portion of an end of the first side ramp member may be coupled to a portion of an opposite end of the first side platform member, while a portion of an end of the second side ramp member may be coupled to a portion of an opposite end of the second side platform member. A portion of an opposite end of the first side ramp member and a portion of an opposite end of the second side ramp member may be configured to contact a bed of the transportation vehicle, wherein the at least one platform assembly may be elevated.

Furthermore, the plurality of platform members may include a first platform member spaced from a second platform member so that a wheel of the all-terrain vehicle selectively and securely engages the wheel when the all-terrain vehicle is driven onto a portion of the platform assembly and a third platform member may be spaced from the second platform member to provide traction when the wheel is driven off a portion of the one or more platform assemblies.

In an aspect of the rack apparatus, the all-terrain vehicle may be confined between a front panel and a tailgate of the transportation vehicle.

In another aspect, the rack apparatus may further comprise one or more front assemblies including one or more front members each having an end, a portion of the end coupled to a portion of the one or more clamp assemblies. Thus, the one or more front members may be configured to prevent the all-terrain vehicle from colliding with a portion of a vehicle cabin of the transportation vehicle.

In yet another aspect the rack apparatus may further comprise a side assembly. The side assembly may have one or more side members. A portion of an end of the one or more side members may be coupled to a portion of the one or more platform assemblies. The one or more side members may be substantially perpendicular to at least one of the first side platform member and the second side platform member. The side assembly may be adapted to guide the ATV wheel along an upper portion of the one or more platform assemblies.

In another aspect, the all-terrain vehicle comprises one or more vehicles having at least two wheels.

In yet another aspect, the one or more clamp assemblies may be adapted to fixedly couple to a portion of at least one panel of the transportation vehicle.

In another aspect, the rack apparatus may comprise a pair of clamp assemblies, wherein each of the pair of clamp assemblies are adapted to selectively and independently couple to a portion of at least one panel of the transportation vehicle.

In another aspect, the rack of apparatus may further comprise a portion of more than one platform assembly coupled to a portion of at least one of the one or more clamp assemblies.

In yet another aspect, the rack apparatus may further comprise one or more tie-down assemblies each of the tie-down assemblies having at least one tie-down side member adapted to couple to a portion of a panel of the transportation vehicle. The tie-down assemblies may include at least one coupler configured to further secure the all-terrain vehicle on the one or more platform assemblies.

In another aspect, the rack apparatus may further comprise one or more secondary ramp assemblies. A portion of an end of the one or more secondary ramp assemblies may be adapted to contact a portion of the bed of the transportation vehicle when a tailgate of the transportation vehicle is opened to provide access to the one or more ramp assemblies.

In yet another aspect, the rack apparatus may comprise a kit configured for facile assembly and transportation.

In a further aspect, the kit may include one or more instructions and one or more fasteners and accessories.

The foregoing and other objects, features, and advantages of the invention will be apparent from the following, more detailed description of the various embodiments of the invention, as illustrated in the accompanying drawings.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature may be called out in another drawing.

The Figures are numbered and annotated so that one skilled in the art of apparatus suitable for transportation of small and recreational vehicles in a trailer or truck bed, by reference to the Figures, will easily be able to understand the materials and method of construction and will be able to easily assemble the parts to achieve the functionality shown.

In the Summary and Preferred Embodiments above, the Description of the Invention, and the Claims and Abstract below, and in the accompanying drawings, reference may be made to particular features (including method steps) of the invention. It is to be understood that this disclosure includes most possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention, and in the invention generally.

The term "comprises" and grammatical equivalents thereof are used herein to mean that other components, ingredients, steps etc. are optionally present. For example, an article "comprising" (or "which comprises") components A, B and C can consist of (i.e., contain only) components A, B and C, or can contain not only components A, B and C but also one or more other components.

Where reference is made herein to a method comprising two or more defined steps, the defined steps may be implemented in any order or simultaneously (except where the context excludes that possibility). Moreover, the method may include one or more other steps that may be implemented before any of the defined steps, between two of the defined steps, or after all the defined steps (except where the context excludes that possibility).

The term "at least" as denoted herein means one or more, while the term a "plurality" means two or more.

The term "or" is used herein as a conjunction used to link alternatives in a series of alternatives. The term "and/or" is used herein as a conjunction meaning that either or both of two options may be valid.

The term "and" is used herein as a conjunction to indicate an additional thing situation or fact.

When used in the appended claims the term "comprising at least one of A and B" as used herein (depending on the context of the specification) may mean: comprising either one of A or of B (and more), or comprising both of A and of B (and more). As is understood in the patent art, "comprising A" means "A and more", while "comprising B" means "B and more". Thus if A is excluded according to the context of the specification in the phrase "comprising at least one of A and B", then A cannot be part of the "and more" and similarly for B if B is excluded according to the context of the specification.

When an element includes a list of numbers following the named element separated by commas, the meaning of this list refers to the named elements in the conjunctive form "and/or", unless otherwise noted. For example, the term: "a member 10, 12, 14, 16, 18" would mean "a member 10 and/or a member 12 and/or a member 14 and/or a member 16 and/or a member 18".

The term "all-terrain vehicle" means any all terrain-vehicle as currently understood or as may be developed in the future. Such vehicles include (without limiting the scope of the invention) motorcycles, four-wheel vehicles, three wheel vehicles, vehicles with wheels and/or tracks of any number, snowboards and the like.

Figure 1A:
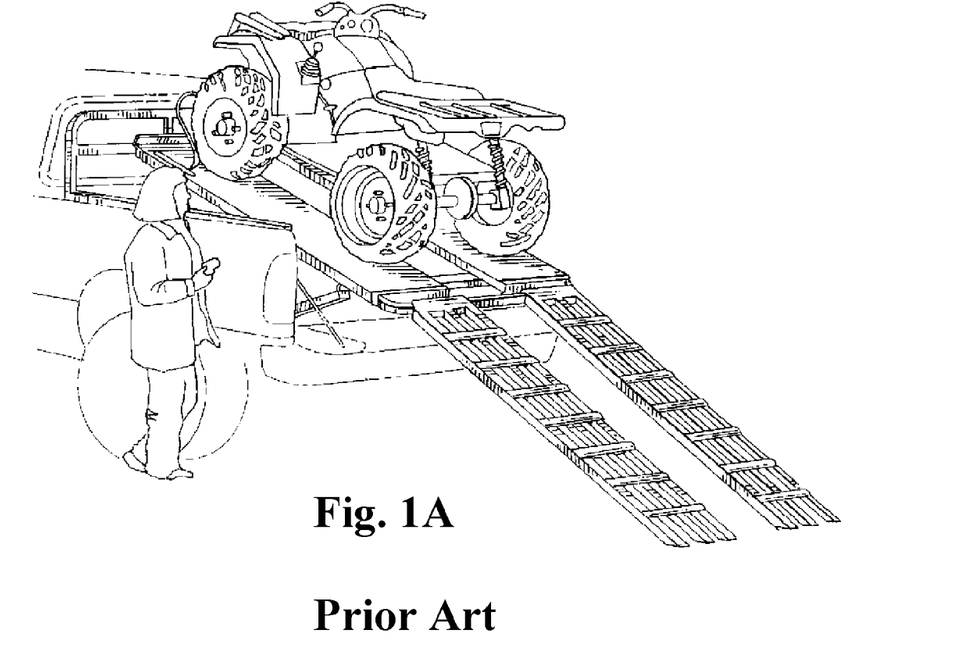
FIG. 1A is a front perspective view of the Schilling transportation device discussed above in the Background Section of this disclosure.
Figure 1B:
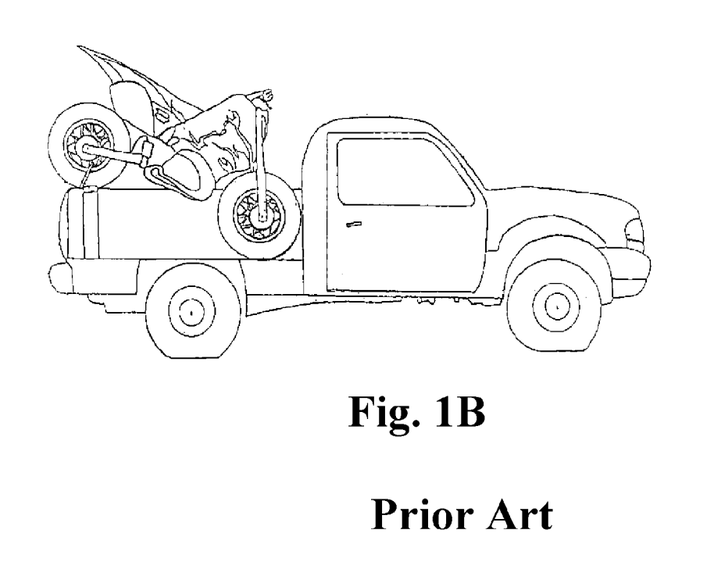
FIG. 1B is a side elevation view of the Widdowson transportation device and method discussed above in the Background Section of this disclosure.

FIG. 1A and FIG. 1B both generally show various prior art transportation devices configured to carry a vehicle such as an ATV as previously discussed above in the Background Section of this disclosure. In particular, with reference to FIG. 1A it may be readily seen that the prior art Schilling transportation device comprises a pair of ramps coupled to a lifting platform that raises the ATV above a truck bed with the aid of a lift device coupled to a bottom portion of the lifting platform. The Schilling lifting platform further comprises a wheel chock located on a front portion of the lifting platform. With reference to FIG. 1B, the Widdowson transportation device comprises a support for a back wheel of a motorcycle, such that the front wheel of the motorcycle is located on a portion of a truck bed wherein the motorcycle has been previously hoisted in a cargo box having an open end. According Widdowson's disclosure and further Widdowson's figures, the support may comprise a crossbar positioned across two back side panels of the truck.

Figure 2:
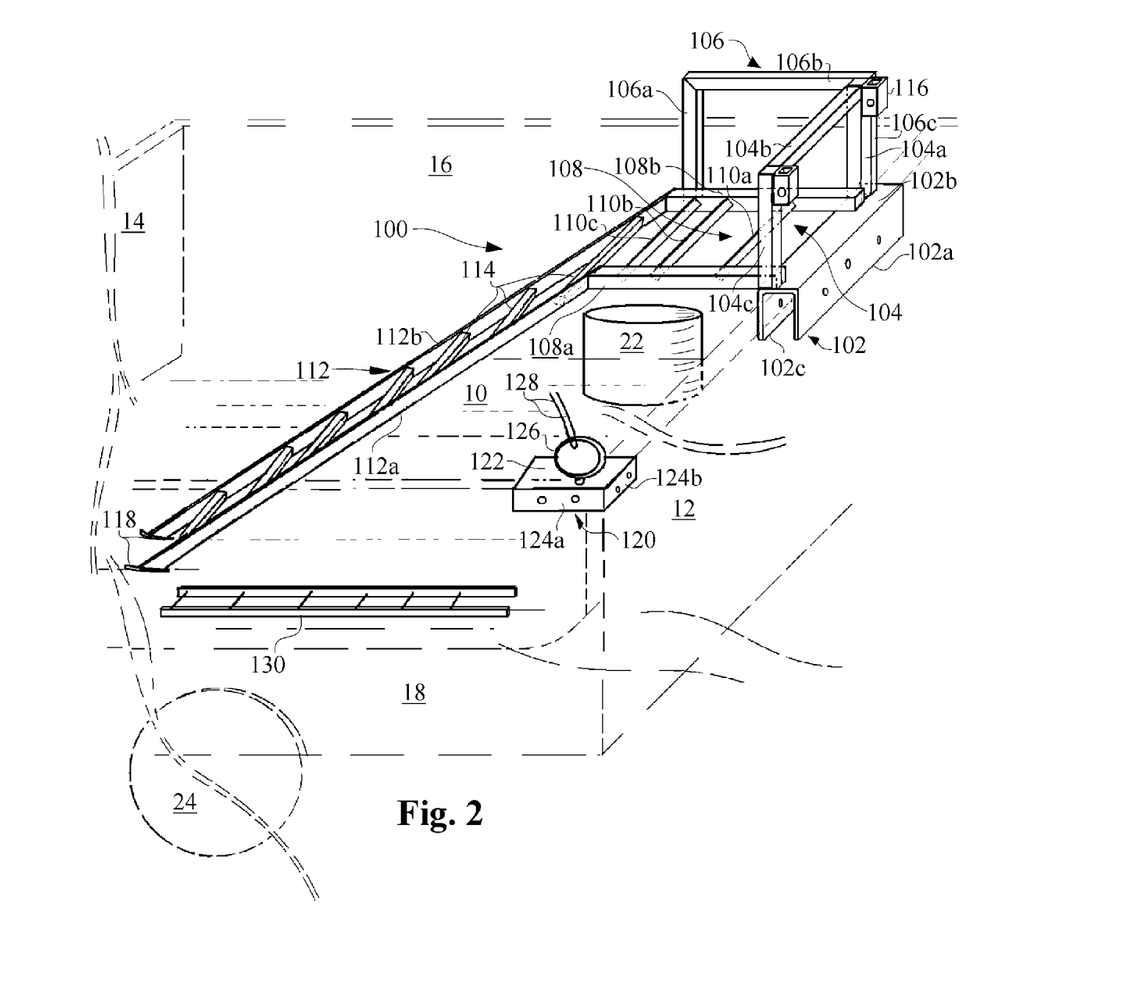
FIG. 2 depicts a side perspective view of a vehicle rack apparatus and system according to an exemplary embodiment of this invention.

Referring now to FIG. 2 in an exemplary embodiment of a vehicle rack apparatus (hereinafter termed "rack apparatus") 100 according to an exemplary embodiment of this disclosure, the rack apparatus may comprise a clamp assembly 102 having one or more openings. As depicted in FIG. 2, the clamp assembly 102 may comprise a first clamp member 102a, which may be contiguous with a second clamp member 102b and the second member may be contiguous with a third clamp member 102c. As illustrated in FIG. 2, the clamp assembly 102 generally has a substantially C-shape or U-shape and the clamp assembly may be selectively coupled to a portion of a panel (shown as a front panel 12 of a trailer or of a truck for illustrative purposes in FIG. 2). While the clamp assembly 102 may be conveniently shaped as described above, FIG. 2A illustrates an alternative embodiment of the clamp assembly 102 wherein the clamp assembly 102 comprises a first clamp member 102a substantially perpendicular to a second clamp member 102b and the first clamp member may be selectively coupled to a panel of a truck or of a trailer. It has been found that in some situations trailer and truck panels may not be able to withstand significant compressive and lateral forces exerted on such panels. In an aspect of the disclosure, an upper portion of a front panel 12, a back panel 14, a first side panel 16 or a second side panel 18 (shown in phantom lines in FIG. 2) may be reinforced with a reinforcing member (not shown) prior to coupling the clamp assembly 102 to one or more of the panels. It will be appreciated that the reinforcing member may be an optional feature of a system comprising the rack apparatus 100.

Figure 2A:
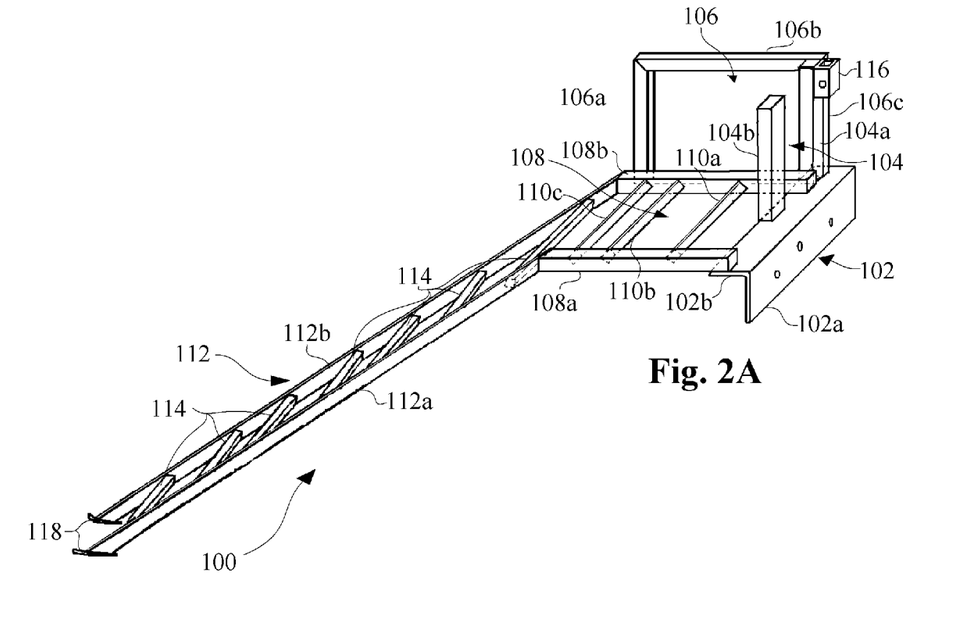
FIG. 2A depicts a side perspective view of another vehicle rack apparatus according to another exemplary embodiment of this invention.

With further reference to FIG. 2, the rack apparatus 100 may further comprise a front frame assembly 104. The front frame assembly 104 may comprise a first front frame member 104a with a portion of an end of the first front frame member substantially perpendicular to a portion of a top surface of the clamp assembly 102. The front frame assembly 104 may further comprise a second front frame member 104b with a portion of an end of the second front frame member coupled to a portion of an opposite end of the first front frame member 104a. As depicted in FIG. 2, the second front frame member 104b may be elevated above and may be substantially coplanar to a portion of a top surface of the clamp assembly 102 such as the top surface of the clamp member 102b. Furthermore, the front frame assembly 104 may further comprise a third front frame member 104c with a portion of an end of the third front frame member coupled to a portion of an opposite end of the second front frame member 104b. Additionally, a portion of an opposite end of the third front frame member 104c may be substantially perpendicular to a portion of a top surface of the clamp assembly 102 such as the clamp member 102b. A portion of the end of the first front frame member 104a and a portion of the opposite end of the third front frame member 104c may be coupled (welded, fastened, adhesively mounted) to a portion of a top surface of the clamp assembly 102 such as the clamp member 102b. Of course, the front frame assembly 104 may comprise a fourth frame member (not shown in FIG. 2). A portion of an end of the fourth frame member may be coupled to a portion of the opposite end of the third member 104c, while a portion of an opposite end of the fourth member may be coupled to a portion of the end of the first member 104a. Subsequently, a longitudinal portion of the fourth member may be coupled to the clamp assembly 102. While FIG. 2 has been described with respect to several embodiments of the front frame assembly 104, FIG. 2A illustrates yet another embodiment of a frame assembly 104 which may be operationally equivalent (see further description with reference to FIG. 2A below).

In an aspect, the clamp assembly 102 and the front frame assembly 104 may comprise an integral structure formed by a process such as injection molding, casting and the like as is understood in the art. In another aspect, the front frame members 104a, 104b, 104c may comprise substantially prismatic shaped rods (shown in FIG. 2 as square-shaped rods) or cylindrical-shaped rods and the rods may have one or more openings. In other words, one or more of the rods may comprise one or more tubes. In an aspect, a portion of the ends of the rods may be configured with or comprise male and female fittings as is understood in the art and may be further adapted to be coupled so that the front frame assembly 102 may be readily assembled by a consumer. Thus, a portion of the ends of the rods may be coupled with bolts and nuts or may comprise well-known spring-loaded fittings wherein a spring-loaded male fitting may be securely coupled to an opening of a female fitting that may receive a corresponding spring-loaded male fitting. In yet another aspect, the front frame assembly 102 may simply comprise a sheet material (not shown) coupled to a top surface of the clamp assembly 102 as is well understood in the art. The sheet material may be fully closed or may have one or more openings as desired.

In yet another aspect, without limiting the disclosure, the clamp assembly 102 may comprise a first member configured to couple to a panel such as the panel 12 and an adjacent second member coplanar with and perpendicular to the first member (not shown). The second member may couple to the side panel 16 or to the side panel 18 of a truck or trailer. An end of the first member may be selectively extended and an opposite end of the first member may be coupled to an end of the second member to facilitate positional adjustment of the rack apparatus. The first member and the adjacent second member of the clamp assembly 102 may be substantially L-shaped. In such a configuration considerable advantage could be gained in stabilizing the rack apparatus 100 by coupling the clamp assembly 102 to the pre-configured substantially L-shape of adjacent panels of a truck or trailer instead of to a single panel.

In another aspect, as a further advantageous feature of the rack apparatus 100, a portion of the front frame assembly 104 may comprise one or more accessory holders 116. As shown in FIG. 2 (also FIG. 2A, FIG. 3A, FIG. 3B, FIG. 4A, FIG. 4B and FIG. 5), each of the accessory holders 116 may comprise a substantially square or rectangular shaped rod having one or more openings. It will be readily appreciated by a person skilled in the art that the accessory holders 116 may be adapted for use with one or more further elements (not shown) coupled to a portion of the rack apparatus as desired.

In an aspect, with reference to FIG. 2, the rack apparatus 100 may comprise a side frame assembly 106. As previously described with respect to the front frame assembly 104, the side frame assembly 106 may comprise a first side member 106a, a second side member 106b, a third side member 106c and optionally a fourth side member (not shown). In the same manner as described previously with respect to the front frame assembly 104, a portion of each of an end of the first side member 106a and a portion of an end of the third side member 106c may be coupled to a portion of a top surface of the clamp assembly 102, such as the second clamp member 102b. Further, a portion of an end of the second side member 106b may be coupled to a portion of an opposite end of the first side member 106a, while a portion of an opposite end of the second member may be coupled to a portion of an opposite end of the third member 106c. With reference to FIG. 2, the side frame assembly 106 may be substantially perpendicular to the front frame assembly 104. A portion of a surface of the third side member 106c may be coupled to a portion of a surface of the first front member 104a to provide increased stability. In other words the front frame assembly 104 and the side frame assembly 106 may be substantially L-shaped and thus define a portion of a wheel guide (chock, stop, block or wedge) of an upper portion of the rack apparatus 100. Of course, a portion of the accessory holders 116 may be coupled to a portion of any of the side frame members 106a, 106b, 106c as described above with reference to the front frame members 104a, 104b, 104c and indeed any other elements of the rack apparatus 100.

Referring to FIG. 2, the rack apparatus 100 may further comprise a platform assembly (upper portion of a ramp or a ladder) 108 having one or more platform rungs (steps, stairs, treads and the like) 110 (shown in FIG. 2, FIG. 2A, FIG. 3A, FIG. 3B, FIG. 4A and FIG. 4B with character numbers 110a, 110b, 110c). In an aspect of the disclosure as described below, it has been found to be advantageous that the number of platform rungs 110 should be three at a minimum. However, without limiting the disclosure, it should be appreciated that the number of platform rungs 110 may be varied as desired. The platform assembly 108 may comprise a first platform member 108a and a second platform member 108b. Each of the platform members 108a, 108b may comprise a rod or tube as described above with respect to the front frame members 104 a, 104b, 104c and the side frame members 106a, 106b, 106c. In an aspect, the first platform member 108a may be substantially parallel and coplanar with the second platform member 108b.

Furthermore, a portion of an end of each of the platform rungs 110 may be coupled to a portion of an inner side of the first platform member 108a. Additionally, a portion of an opposite end of each of the platform rungs 110 may be coupled to a portion of an inner side of the second platform member 108b. As can be readily seen by reference to FIG. 2, each of the platform rungs 110 may be substantially perpendicular to an inner side of each of the first platform member 108a and the second platform member 108b (see FIG. 2). Of course, each of the platform rungs 110 may also comprise a rod configured as a tube.

Furthermore, again with reference to FIG. 2, a portion of an end of the first platform member 108a and a portion of an end of the second platform member 108b may be coupled (rigidly or pivotally) to a portion of the clamp assembly 102. Advantageously, as may be readily appreciated by a person skilled in the art, the platform assembly 108 described herein, may also be rigid, stable and lightweight. In an aspect, because the clamp assembly 102 may be coupled to the front panel 12 of a truck (shown by phantom lines in FIG. 2), the platform assembly 108 may be elevated above a truck bed (or a trailer bed) 10 (also shown by phantom lines in FIG. 2). However, it should be understood that without limiting the disclosure, in yet another contemplated embodiment of the rack apparatus 100, any panel 12, 14, 16, 18 of a trailer or a truck may be fitted with one or more suitable coupler members on any portion of the panels (not shown in FIG. 2). The clamp assembly 102 could then be coupled to any one of the coupler members to vary the height of the platform assembly 108 above the truck bed 10 as desired. Consequently, a portion of a hidden storage region for various cargo 22 (one only shown in FIG. 2) may be defined by a portion of the platform assembly 108 and the truck (or trailer) bed 10.

Turning back to the platform assembly's rungs 110, as shown in FIG. 2 (and also in FIG. 4A and FIG. 4B, and described below) advantageously, a wheel of an ATV could rest between a first platform rung 110a and a second platform rung 110b to stabilize the ATV on the platform assembly 108 (see FIG. 4A, 4B and the description below). Additionally, the platform assembly 108 may comprise a third platform rung 110c, with the distance between the third platform rung and the second platform rung 110b differing from the distance between the first platform rung 110a and the second platform rung. Consequently, an ATV may be driven onto the platform assembly 108 and an ATV wheel may be selectively secured (or wedged) between the first platform rung 110a and the second platform rung 110b. Furthermore, when it would be desirable to drive the ATV off the platform assembly 108, the third platform rung 110c could facilitate back traction. Without limiting the disclosure, the distance between a top portion of the first platform rung 110a and a top portion of the second platform rung 110b may be about 9 inches, while the distance between a top portion of the third platform rung 110c and a top portion of the second platform rung 110b may be about 3 inches. Furthermore, the distance between a top portion (blunted knife edge) of the first platform rung 110a and a portion of an end of the front frame member 106b coupled to the clamp assembly 102 (which may be substantially coplanar with the top portion of the first platform rung) may be about 7 inches. It was determined that these distances were desirable for standardized ATV wheels having an outer diameter of between about 25 inches and 27 inches such as for conventional motorcycles and conventional all terrain recreational vehicles. Of course, without limiting the disclosure, the distance between a top portion of the first platform rung 110a and a top portion of the second platform rung 110b and between the top portion of the second platform rung and the top portion of the third platform rung 110c, as well as the distance between the top portion of the first platform rung and the lower back portion of the front frame member 110b may be altered according to the diameter of any ATV wheel now existing or that may be made available in the future.

Figure 5:
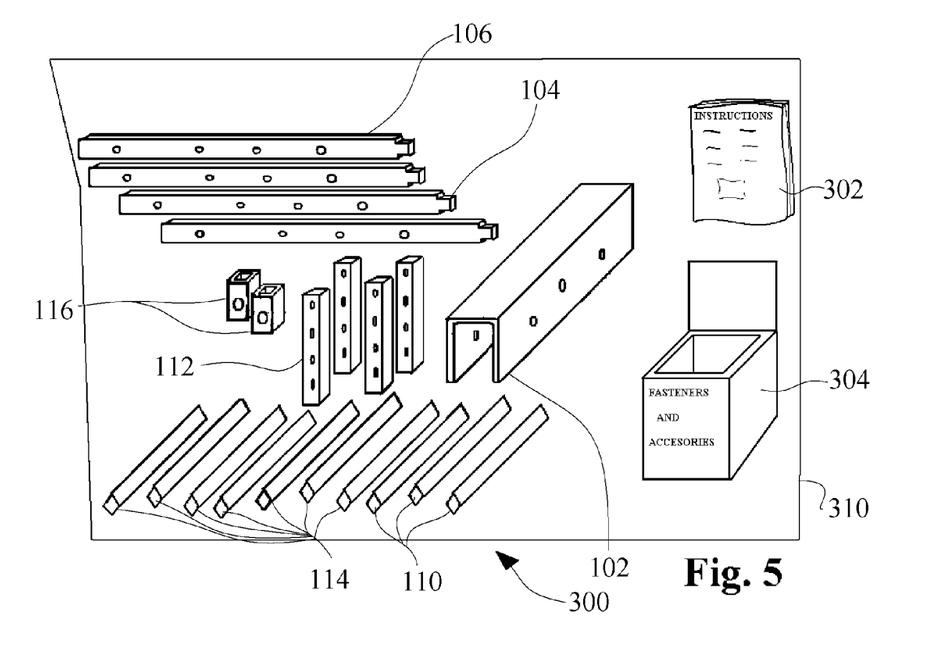
FIG. 5 depicts a front perspective view of a portion of a kit comprising an embodiment of the vehicle rack apparatus according to an exemplary embodiment of this invention.

With reference to FIG. 2, FIG. 2A and FIG. 5, in yet another aspect of the platform rungs 110, it may be seen that the platform rungs may be advantageously oriented on the platform members 108a, 108b so that a top portion of each of the platform rungs substantially comprises a blunted knife edge of each platform rung. Since an outer portion of an ATV wheel typically has one or more ribs somewhat in a corrugated shape to provide enhanced gripping on a ground surface, the specific orientation of the platform rungs 110 may enhance contact between an outer portion of the ATV wheel and the platform rungs.

Referring further to FIG. 2, the rack apparatus 100 may further comprise a ramp (or a ladder, an incline, a rise and the like) assembly 112 including a first ramp member 112a and a second ramp member 112b. The first ramp member 112a may be substantially parallel to and coplanar with the second ramp member 112b. A portion of an end of the first ramp member 112a may be coupled (rigidly or pivotally) as is understood by a person skilled in the art to a portion of an opposite end of the first platform member 108a. Similarly, a portion of an end of the second ramp member 112b may be coupled (rigidly or pivotally) to a portion of an opposite end of the second platform member 108b. Further, as described above with reference to the platform assembly 108, the ramp assembly 112 may comprise one or more ladder rungs 114. Of course, the ramp assembly 112 comprising the first and second ramp members 112a, 112b and the one or more ladder rungs 114 may be constructed in a variety of ways.

Without limiting the disclosure and possible construction methods, but merely to illustrate one possible assembly method, each of the ramp members 108a, 108b may have one or more holes (not shown) which may be aligned to one another in a corresponding fashion in each of the ramp members. Each end and each opposite end of each of the ladder rungs 114 may each have a threaded opening configured to receive a pair of screws. A first screw may be inserted into a first ramp member's hole and the first screw may then be threaded into the threaded rung opening of a first rung. The same procedure may be applied to a second ramp member's hole, and a second screw may then be threaded into the threaded rung opening of an opposite end of the ladder rung 114 to provide an H-shaped section. Remaining ladder rungs 114 may thus be coupled to the first ramp member 112a and the second ramp member 112b. Of course, without limiting the disclosure, this is but one procedure of numerous other assembly methods known in the art. However, it is to be understood that a specific method of assembling the ramp assembly 112 or the platform assembly 108 does not limit other aspects of the current disclosure. If other methods of assembling the ramp assembly 112 or the platform assembly 108 or any other portions of the rack apparatus 100 or a rack system derived from the rack apparatus are disclosed in the future, those disclosures would not limit the other current aspects of the rack apparatus as disclosed herein.

A portion of an opposite end of the first ramp member 112a may comprise a footing 118 while an opposite end of the second ramp member 112b may comprise another footing 118 to protect a portion of a surface of the truck bed 10 when the footing contacts the truck bed. Without limiting the disclosure, the footing 118 may comprise any type of material including rubber, plastic and the like. Furthermore, without limiting the disclosure, as is well understood, a portion of the footing 118 may be pivotally coupled to a portion of the opposite end of each of the ramp members 112a, 112b to better conform a portion of the opposite end of each ramp member 112a, 112b of the ramp assembly 112 to a portion of the surface of the truck bed 10. As shown in FIG. 2, the ramp assembly 112 that contacts a top surface of the truck bed 10 may substantially slope at an acute angle relative to a portion of the top surface of the truck bed. Of course, in an aspect, this slope angle may be substantially defined by the height of the front panel 12 and the length of the truck bed 10 and may be further defined according to whether the truck bed is substantially planar and is substantially perpendicular to any of the panels 12, 14, 16 and 18. In any case, according to the configuration of the rack apparatus 100 described above and further shown in FIG. 2, it may be readily appreciated that an ATV may be conveniently confined between the front panel 12 and the rear panel 14 (and/or the tailgate 40, see FIG. 4A and FIG. 4B and the description below) of a truck or trailer. Consequently, a front portion of an ATV may be elevated on the platform assembly 108 relative to a back portion of the ATV, when the front of the ATV would be driven up the ramp assembly 112 and onto the platform assembly (see FIGS. 4A, 4B and the description below). Without limiting the disclosure, it may be possible that an ATV could be driven in backwards onto the ramp assembly 112 and further onto the platform assembly 108. Therefore, when the ATV drives backward onto the platform assembly 108, a back portion of an ATV may be elevated by the platform assembly relative to a front portion of the ATV that contacts a portion of a top surface of the truck bed 10.

Referring further to FIG. 2, a rack system may comprise the rack assembly 100, one or more tie-down assemblies 120 (one shown in FIG. 2) and one or more ground to truck bed ramps (hereinafter, "secondary ramps") 130 (one shown in FIG. 2). As might be expected, the secondary ramps 130 facilitate driving of an ATV from a ground surface onto a portion of the truck or trailer bed 10 and thereafter onto the ramp assembly 112. Advantageously, because of extra space defined by a region between the sloping rack assembly 112, the elevated platform assembly 108 and the truck or trailer bed 10, the secondary ramps 130 may be easily stored on a portion of a surface of the truck bed. Of course, in other configurations, the secondary ramps 130 may be stored in or on other sections of a transportation vehicle such as a truck or a trailer as is understood in the art. Furthermore, as expected, the secondary ramps 130 may be assembled as described above with respect to the ramp assembly 112. In yet another aspect of the disclosure, a portion of an end of each of one or more secondary ramps 130 may be selectively coupled to an opposite end of each of one or more of the ramp assemblies 112 (see FIG. 3A and FIG. 3B for potential configurations relating to two rack apparatus). When coupled in this manner, a secondary ramp 130 may be configured to decouple from the opposite end of a corresponding rack assembly 112. Alternatively, the secondary ramp 130 may be configured to fold up and act as a backstop to a rear wheel of an ATV.

Figure 2B:
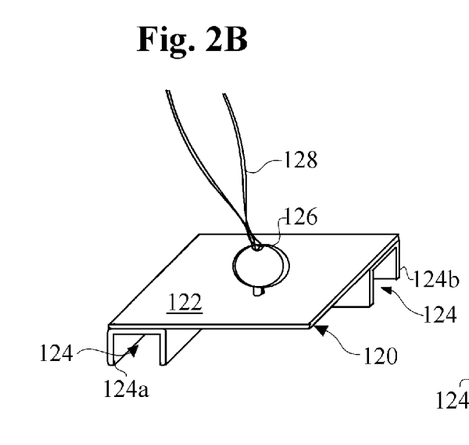
FIG. 2B depicts a front perspective view of an embodiment of a securing member of a portion of the vehicle rack system of FIG. 2.
Figure 2C:
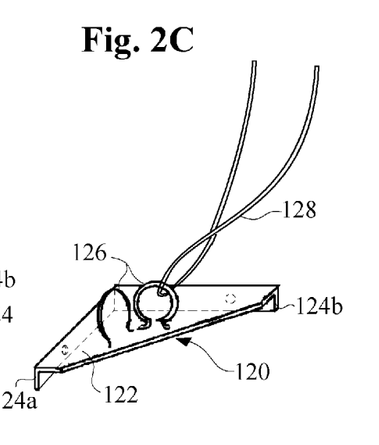
FIG. 2C depicts a front perspective view of another embodiment of a securing member of a portion of the vehicle rack system of FIG. 2.

Turning now to the tie-down assembly 120 illustrated in FIG. 2, the tie-down assembly may comprise a top member 122 and a first side member 124a having one or more openings, as well as a second side member 124b having one or more openings. The side members 124a, 124b may be coupled to a portion of a panel such as the side panel 18 and the front panel 18 with one or more bolts or in any other manner as would be understood in the art. Although FIG. 2 illustrates one embodiment of a tie-down assembly 120, of course other embodiments of the tie-down member exist. For example, FIG. 2B illustrates an embodiment of the tie-down member including a top member 122 and wherein the side members 124a, 124b may comprise a first U-shaped clamp member and a second U-shaped clamp member portion of a clamp assembly 124. Naturally, the first U-shaped clamp member 124a and the second U-shaped clamp member 124b may be an integrated clamp assembly 124 or more than one U-shaped clamp assemblies 124. Of course, the tie-down assembly 120 illustrated in FIG. 2 or in FIG. 2B may be configured with a single U-shaped substantially longitudinal clamp assembly 124 which may be coupled to a portion of any panel such as the front panel 12, the back panel 14, or either of the side panels 16, 18. However, without limiting the disclosure it may be that such a single U-shaped substantially longitudinal clamp assembly 124 could provide weaker coupling to a panel. In another embodiment of the tie-down assembly 120, the top member 122 may have a different shape compared to the embodiments of FIG. 2 and FIG. 2B. Furthermore, regarding the tie-down assembly 120 of FIG. 2 or of FIG. 2B, a portion of a ring (or a hook) 126 may be coupled to a portion of the top member 122. The ring 126 may be welded or selectively threaded into the top member having a threaded opening or otherwise coupled to the top member 122 as may be understood in the art. Of course, the top member 122 may comprise a male threaded protrusion (not shown) and a portion of the ring 126 may comprise a threaded opening (not shown) that may be coupled to the male threaded protrusion. Alternatively, the ring 126 and the top member 122 may be an integral member such as formed by thermoplastic injection molding or casting and the like. Of course one or more other rings 126 may be coupled to a portion of the top member 122 (see FIG. 2C). Furthermore, with out limiting the disclosure, the one or more hooks 126 may be configured to rotate axially about an axis substantially perpendicular to a portion of the surface of the top member 122 as is understood in the art. Clearly, in other aspects of the disclosure, a portion of the rings 126 may be coupled to a portion of the side members 124a, 124b rather than a portion of the top member 122. With further reference to FIG. 2, FIG. 2B and FIG. 2C a rope 128 may be looped through each ring 126 and may further be selectively coupled to a portion of an ATV as an extra measure to secure the ATV on the rack apparatus 100.

Referring now to FIG. 2A, which illustrates an alternative embodiment of the rack apparatus 100, in most respects the embodiment of FIG. 2 and of FIG. 2A are substantially identical. However, it should be noted that the clamp assembly 102 of FIG. 2A comprises a first clamp member 102a and a second clamp member 102b. As illustrated in FIG. 2A the clamp member 102a has one or more holes that may receive one or more bolts or screws (not shown) adapted to couple to a portion of a panel of the truck or trailer as discussed above with reference to FIG. 2. Of course, without limiting the disclosure, the clamp member 102a may be coupled adhesively or welded to a portion of a panel of the truck or trailer.

In yet another aspect of the rack apparatus 100 of FIG. 2A, the front frame assembly 104 may comprise one or more front frame members 104a, 104b. However, in contrast to the front frame assembly 104 illustrated in FIG. 2, the frame member 104b has a portion of the first end of the frame member coupled to a portion of a top surface of the second clamp member 102b. Naturally, without limiting the disclosure, the clamp assembly 102 and the frame assembly 104 may comprise an integrated structure formed by any suitable process such as thermoplastic molding or casting and the like.

Figure 3A:
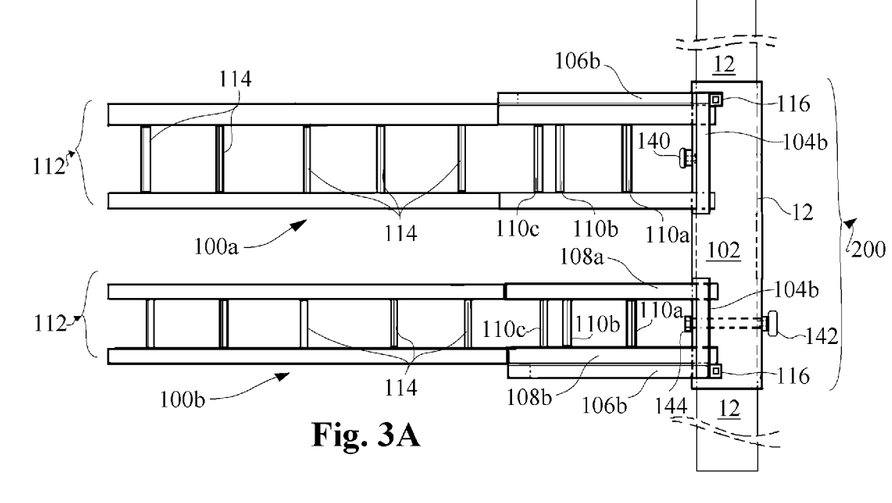
FIG. 3A depicts a top plan view of a unitary vehicle rack apparatus according to an exemplary embodiment of this invention.
Figure 3B:
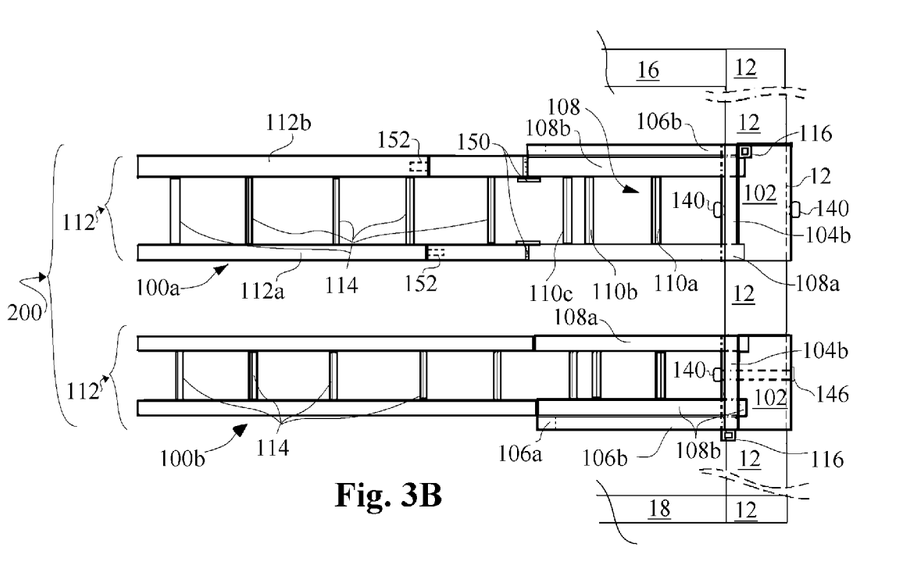
FIG. 3B depicts a top plan view of a modular vehicle rack apparatus according to another exemplary embodiment of this invention.

FIG. 3A depicts a top plan view of a unitary vehicle rack apparatus 200. According to FIG. 3A, the unitary vehicle rack apparatus 200 may comprise a pair of rack assemblies 100a, 100b wherein a first rack assembly 100a may be substantially a mirror image of a second rack assembly 100b and a portion of the first rack assembly may be coupled to a portion of the second rack assembly. As illustrated in FIG. 3A, the clamp assembly 102 may be elongated and a portion of an end of each of the respective platform members 108a, 108b of each of the rack assemblies 100a, 100b may be coupled to a portion of a top surface of the clamp assembly 102. Of course, the platform members 108a, 108b may be coupled to any portion of the clamp assembly 102. In all other respects each of the first rack assembly 100a and the second rack assembly 102b are substantially identical to the rack apparatus described above with reference to FIG. 2 and FIG. 2A. The top plan view of FIG. 3A also illustrates several embodiments of methods of coupling the clamp assembly 102 to a panel such as the front panel 12. Thus in one aspect, a bolt 140 may be provided, wherein the bolt has a male threaded portion and the threaded bolt couples to one or more threaded openings in the clamp assembly 102 (as discussed above with reference to FIG. 2). Naturally, more than one threaded bolt 140 may be used to provide extra clamping stability. FIG. 3A illustrates that the bolt 140 may be coupled through the panel 12 and locked in place with a nut 142 as is understood in the art. Alternatively, as illustrated in FIG. 3B, a non-threaded bolt 140 may be inserted through an opening of the clamp assembly 102 and from there, through a panel, such as the front panel 12 having an opening and from there, through another opening of the clamp assembly 102 and finally the non-threaded bolt may be coupled with a rivet 146 or by a splint passing through a portion of an end of the non-threaded bolt having an opening. Naturally, these are merely some possible examples of methods of coupling the clamp assembly 102 to a panel. Furthermore, it should be understood that the clamp assembly 102 could be selectively adjusted along any panel as desired. Thus, for instance, it would be possible to move the clamp assembly 102 closer towards one side and farther from the opposite side of a trailer or truck bed as desired.

FIG. 3B depicts a top plan view of a modular vehicle rack apparatus 200. According to FIG. 3B, the modular vehicle rack apparatus 200 may comprise a pair of rack assemblies 100a, 100b wherein a first rack assembly 100a may be substantially a mirror image of a second rack assembly 100b. Once again, each of the first rack assembly 100a and the second rack assembly 102b are substantially identical to the rack apparatus described above with reference to FIG. 2 and FIG. 2A. As shown in FIG. 3B, a consumer may independently and selectively couple each of a first clamp assembly 102 of the first rack assembly 100a and a second clamp assembly of the second rack assembly 102b to a panel such as the front panel 12. As may be readily appreciated, such a configuration of the vehicle rack apparatus 200 may be highly advantageous because now it may be possible as desired to vary the distance between each of the first rack assembly 100a and the second rack assembly 102b and thus accommodate the distance between any ATV's wheels. Furthermore, of course, each of the first rack assembly 100a and a second clamp assembly of the second rack assembly 102b may accommodate a motorcycle, so that two motorcycles may be transported in a truck or trailer bed. Additionally, of course, as many motorcycles may be accommodated within a truck or trailer bed region and transported by a truck depending on the number of rack assemblies 100 that may be coupled to a panel. Moreover, since the distances between the platform rungs 110, 110b and 110c may be altered to both selectively retain the wheels of an ATV securely on a portion of the platform assembly 108 (see discussion above with reference to FIG. 2) and also to facilitate powered retraction of the ATV wheels from the platform assembly, the rack assemblies provide extremely versatile means to transport any kind of ATV now existing or any ATV that may be designed in the future.

In yet another aspect of the modular vehicle rack apparatus 200, FIG. 3B illustrates that any rack assembly 100 may have additional convenient features. Thus, according to FIG. 3B, one or more portions of the ramp members 112a, 112b of the rack assembly 100a may include one or more pins 152 that may be received by and coupled to one or more portions of the ramp members 112a, 112b having openings. Therefore, it may be possible that the ramp assembly 100 could be assembled readily from a number of elements (see FIG. 5 and the description below with reference to a rack apparatus kit 300). Of course, any longitudinal member of the rack assembly 100 may be configured with pins and receiver openings as desired.

In a further aspect of the modular vehicle rack apparatus 200, FIG. 3B illustrates one or more pivotal connectors 150 that may include one or more stops so that the ramp assembly 112 may be pivotally coupled to the platform assembly 108.

The various members of the rack apparatus 100 may comprise any substantially rigid materials. Without limiting the disclosure, examples of such materials may include fiberglass or carbon fiber resin composites of various kinds, metals such as steel, cast iron, aluminum, titanium and alloys thereof, filled or unfilled thermoplastic or thermoset resins and the like as is understood in the art.

Figure 4A:
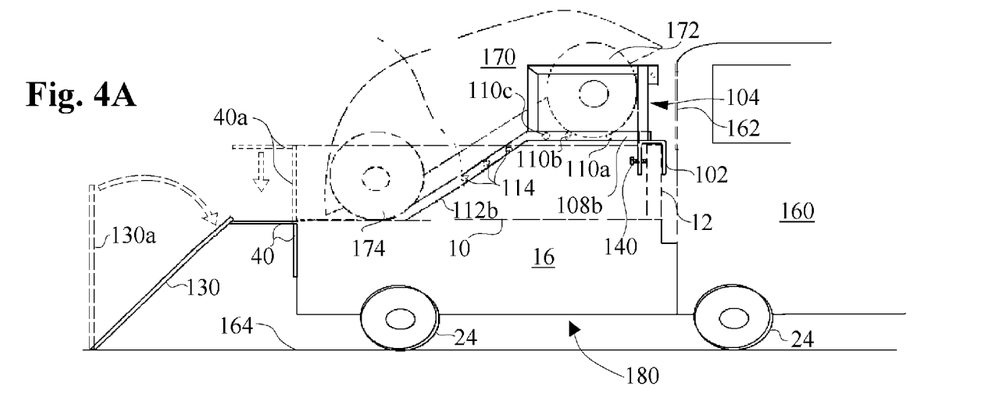
FIG. 4A depicts a side elevational view of a portion of the vehicle rack system of FIG. 2 configured in a truck bed having a lifting tailgate 40 shown in phantom lines in a closed position of the lifting tailgate and further depicted with solid lines in an open position of the lifting tailgate according to an exemplary embodiment of this invention.
Figure 4B:
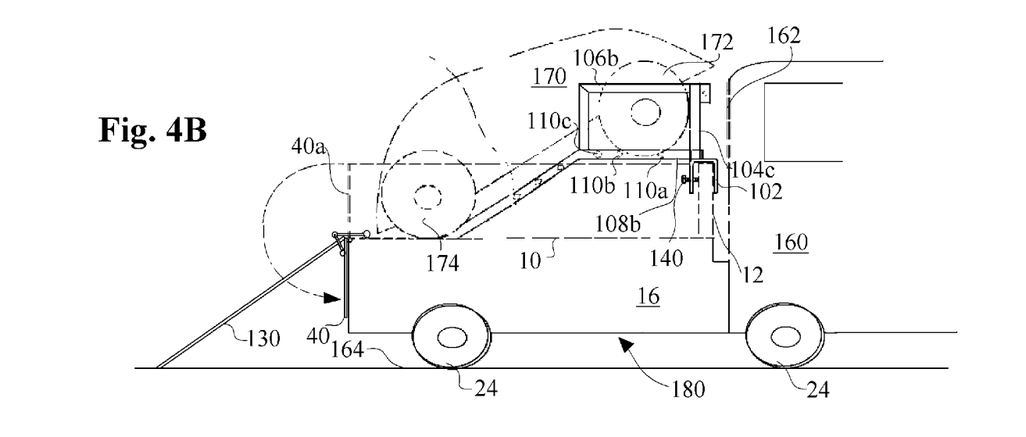
FIG. 4B depicts a side elevational view of a portion of the vehicle rack system of FIG. 2 configured in a truck bed having a conventional tailgate 40 shown in phantom lines in a closed position of the conventional tailgate and further depicted with solid lines in an open position of the conventional tailgate according to another exemplary embodiment of this invention.

Both of FIG. 4A and FIG. 4B depict a side elevational view of a portion of the vehicle rack system comprising the various assembly members and features described above with reference to FIG. 2. The vehicle rack system may be configured in a truck bed 10 of a truck having a tailgate 40a (which may also be a back panel 14 of the truck) shown in phantom lines in a closed position of the tailgate and further depicted with solid lines in an open position of the tailgate 40. In FIG. 4A, the secondary ramp 130a is shown in phantom lines in a raised position and in solid lines in a lowered position of the secondary ramp 130. Arrows generally indicate the movement that may occur for each of the tailgate 40 and the secondary ramp 130 in both FIG. 4A and FIG. 4B. Furthermore, both FIG. 4A and FIG. 4B illustrate an ATV 170 (shown in phantom lines having one or more front wheels 172 and one or more back wheels 174). A truck or transportation vehicle 180 may comprise a truck cabin 160 having a back window. Furthermore, the truck 180 has wheels 24. Of course, as illustrated in both FIG. 4A and FIG. 4B, the truck bed 10 may be elevated above a portion of the ground surface 164 from which the ATV 170 would have to be driven, so the secondary ramp 130 permits powered access to the rack system. FIG. 4A and FIG. 4B illustrate different embodiments of the system wherein the tailgate 40 may be opened by means of power lifting (FIG. 4A) as is understood in the art or may be opened pivotally (FIG. 4B) as is also understood in the art.

In operation, an ATV 170 may be loaded into a truck bed 10 of a truck 180 in a procedure comprising several steps. In a first step S1, the tailgate 40 of the truck 180 may be opened to permit access to the truck bed. In another step S2, one or more rack apparatus 100 of the type described above with reference to FIG. 2, FIG. 2A, FIG. 3A and FIG. 3B, may be mounted on the truck bed 10 and one or more clamp assemblies 102 may be selectively and securely coupled to a portion of a front panel 12 of the truck 180. In an optional step S3, the positioning of the clamp assemblies 102 may be altered as needed according to the distance between the one or more front wheels 172 and the one or more back wheels 174 of the ATV 170. In a further step S4, the secondary ramp 130 may be coupled to a portion of the truck bed 10 to enable powered driving of the ATV onto one or more of the rack apparatus 100. Of course, the secondary ramp 130 would also be aligned with the one or more ramp assemblies 112 of the rack assemblies 100. In yet another step S5, the ATV would be driven up the secondary ramp 130 and then onto the ramp assemblies 112 wherein traction provided by the ramp rungs 114 would permit the ATV to climb up the ramp assemblies 112. In yet another step S6, the front wheels 172 of the ATV 170 would be driven over each of the platform rungs 110c, 110b, 110a of each of the ramp assemblies 100, thereby engaging with and securing each of the front wheels 172 of the ATV 170 between the platform rungs 110b and 110a as illustrated in FIG. 4A and FIG. 4B. Furthermore, the front frame assembly 104 would prevent the front wheels 172 of the ATV from crashing into a back window pane 162 of the truck cabin 160. In yet another step S7, one or more tie-down members 120 may also be coupled to a portion of any of the truck's 180 panels such as the front panel 12 or the back (or rear) panel 14 (or tailgate 40) or either of the side panels 16, 18 as discussed above with reference to FIG. 2B and FIG. 2C. Consequently, in a step S8, one or more ropes 128 attached to one or more rings 126 of the one or more tie-down members 120 may be selectively coupled (tied, affixed and the like) to any suitable portion of the ATV 170, such as one or more of the ATV's axels (not shown) or one or more of the ATV's bumpers (not shown) to provide enhanced securing of the ATV to the one or more rack apparatus 100, and therefore to the truck bed 10. It should be readily apparent from the depictions of FIG. 4A and FIG. 4B that the entire ATV 170 may be easily accommodated between the front panel 12 and the back panel 14 including the tailgate 40, while also preventing breakage of the back window pane 162 or for that matter preventing damage to any portion of the truck cabin 160. In another step S8, the tailgate 40 may be closed. Thus the ATV 170 may be transported by the truck 180 in a safe manner. Naturally, when it is desired to drive the ATV 170 off the rack apparatus 100, all the above steps may be reversed. The above description of an operational method for driving an ATV 170 onto the rack apparatus 100 is merely illustrative of one possible procedure and does not limit the disclosure with respect to other procedures and order of steps that may be executed.

FIG. 5 depicts a front perspective view of a portion of a rack apparatus kit 300 comprising an embodiment of the vehicle rack apparatus 100 as discussed above with respect to any of FIG. 2, FIG. 2A, FIG. 3A and FIG. 3B. The rack apparatus kit 300 may be configured for easy assembly by a consumer and may comprise one or more assembly instructions 302. Furthermore, apart from various members of the various assemblies (such as 102, 104, 106, 108, 110, 112, 114) discussed above, the rack apparatus kit 300 may further comprise various fasteners and accessories (including without limiting the disclosure, certain tools, straps, ropes and the like) 304 to facilitate assembly of the vehicle rack apparatus 100 and use of the vehicle rack apparatus. Since the kit 300 configured as discussed above may be suitable for distribution, an outer packaging material 310 may house all the various parts of the kit. Advantageously, the kit 300 may be conveniently shipped after a sale to a consumer. Of course, one or more rack apparatus 100 may comprise the rack apparatus kit 300.

While the invention has been particularly shown and described with reference to preferred embodiments thereof, it will be understood by those skilled in the art that the foregoing and other changes in form and details may be made therein without departing from the spirit and scope of the invention. The scope of the present invention is not intended to be limited by the specific examples set out herein.

What is claimed is:

1. A rack apparatus adapted to transport an all-terrain vehicle in a transportation vehicle, comprising in combination:
    one or more clamp assemblies having one or more openings, said one or more openings configured to selectively couple a portion of said one or more clamp assemblies to a portion of a panel of said transportation vehicle;
    one or more platform assemblies, each platform assembly comprising a plurality of platform members, a portion of an end of each of said plurality of platform members coupled to an inner portion of a first side platform member and a portion of an opposite end of each of said plurality of platform members coupled to an inner portion of a second side platform member, a portion of an end of said first side platform member and a portion of an end of said second side platform member coupled to a portion of said one or more clamp assemblies;
    one or more ramp assemblies, each ramp assembly having a first side ramp member and a second side ramp member, a portion of an end of said first side ramp member coupled to a portion of an opposite end of said first side platform member, and a portion of an end of said second side ramp member coupled to a portion of an opposite end of said second side platform member;
    a portion of an opposite end of said first side ramp member and a portion of an opposite end of said second side ramp member configured to contact a bed of said transportation vehicle, wherein said one or more platform assemblies are elevated;
    said plurality of platform members including a first platform member spaced from a second platform member so that a wheel of said all-terrain vehicle is selectively and securely engages when said all-terrain vehicle is driven onto a portion of said respective platform assembly and a third platform member spaced from said second platform member to provide traction when said wheel is driven off a portion of said one or more platform assemblies.

2. The rack apparatus of claim 1, wherein said all-terrain vehicle is confined between a front panel and a tailgate of said transportation vehicle.

3. The rack apparatus of claim 1 further comprising one or more front assemblies, each from assembly including one or more front members each having an end, a portion of said end of each of said one or more front frame members coupled to a portion of said one or more clamp assemblies, said one or more front members configured to prevent said all-terrain vehicle from colliding with a portion of a vehicle cabin of said transportation vehicle.

4. The rack apparatus of claim 1 further comprising a side assembly, said side assembly having one or more side members, a portion of an end of said one or more side members coupled to a portion of said one or more platform assemblies, said one or more side members substantially perpendicular to at least one of said first side platform member and said second side platform member, said side assembly adapted to guide said all-terrain vehicle wheel along an upper portion of said one or more platform assemblies.

5. The rack apparatus of claim 1 wherein said all-terrain vehicle comprises one or more vehicles having at least two wheels.

6. The rack apparatus of claim 1, wherein said one or more clamp assemblies are adapted to fixedly couple to a portion of at least one panel of said transportation vehicle.

7. The rack apparatus of claim 1, comprising a pair of clamp assemblies, wherein each of said pair of clamp assemblies are adapted to selectively and independently couple to a portion of at least one panel of said transportation vehicle.

8. The rack of apparatus of claim 1, further comprising a portion of more than one of said one or more platform assemblies coupled to a portion of at least one of said one or more clamp assemblies.

9. The rack apparatus of claim 1 further comprising one or more tie-down assemblies, each of said tie-down assemblies having at least one tie-down side member adapted to couple to a portion of a panel of said transportation vehicle, said tie-down assemblies including at least one coupler configured to further secure said all-terrain vehicle on said one or more platform assemblies.

10. The rack apparatus of claim 1 further comprising one or more secondary ramp assemblies, a portion of an end of said one or more secondary ramp assemblies adapted to contact a portion of said bed of said transportation vehicle when a tailgate of said transportation vehicle is opened to provide access to said one or more ramp assemblies.

11. The rack apparatus of claim 1 comprising a kit configured for facile assembly and transportation.

12. The rack apparatus of claim 11 wherein said kit includes one or more instructions and one or more fasteners and accessories.

* * * * *